United States Patent

Kumagai et al.

Patent Number: 5,572,595
Date of Patent: Nov. 5, 1996

[54] METHOD OF DETECTING THE LOCATION OF A HUMAN BEING IN THREE DIMENSIONS

[75] Inventors: Ryohei Kumagai; Zi Quan Hong, both of Tokyo, Japan

[73] Assignee: Yozan, Inc., Tokyo, Japan

[21] Appl. No.: 986,358

[22] Filed: Dec. 7, 1992

[30] Foreign Application Priority Data

Jan. 21, 1992 [JP] Japan .................................. 4-030181

[51] Int. Cl.$^6$ .............................. G06K 9/00; G06K 9/34; G06K 9/46; G06K 9/76
[52] U.S. Cl. ......................... 382/106; 382/118; 382/171; 382/174; 382/210
[58] Field of Search ..................................... 382/118, 115, 382/171, 174, 180, 106, 140, 210; 348/152

[56] References Cited

U.S. PATENT DOCUMENTS

| | | | |
|---|---|---|---|
| 4,975,978 | 12/1990 | Ando et al. | 382/50 |
| 5,016,173 | 5/1991 | Kenet et al. | 364/413.13 |

OTHER PUBLICATIONS

"Determination of Camera Location and Orientation", Kumar, Rakesh, Image Understanding Workshop, 1989, pp. 870–881.
"Photogrammetry & Stereo", Berthold Klaus Paul Horn, Robot Vision, MIT Press, pp. 299–326.

Primary Examiner—Leo Boudreau
Assistant Examiner—Monica S. Davis
Attorney, Agent, or Firm—Cushman, Darby & Cushman

[57] ABSTRACT

A method for detecting the location of a human being in three dimensions from a spatial image of an area that is generated using a lens. Portions of the image having density values within a predetermined range are labeled, those density values corresponding to brightness levels of the pixels in the image. A labeled portion corresponding to a part of the head is selected when the top region of that portion forms the shape of an arch. The width of the selected portion is then determined. Assuming that the part of the head having hair on all persons has a constant horizontal width, the distance from a lens to a human being is calculated based on the determined width of the selected portion. The coordinates of the person are determined based on that distance.

9 Claims, 3 Drawing Sheets

METHOD OF DETECTING THE LOCATION OF A HUMAN BEING IN THREE DIMENSIONS

FIELD OF THE INVENTION

This invention relates to a method for detecting the location of a human being in three-dimensions, and more particularly to a method for detecting the location in three dimensions using an input system having a single lens.

BACKGROUND OF THE INVENTION

Conventionally, two methods are well known for performing three-dimensional location detection: a method of applying parallax to an input system having two-lenses and a method of applying parallax to input generated by a system having a single-lens. However, it is difficult to identify pixels of the two images in either convention method. In addition, the input system of the former method becomes large in size, and the system of the latter method requires excessive input time requirements.

SUMMARY OF THE INVENTION

The present invention solves the above conventional problems. It has an object to provide a method for detecting the location of a human being in three-dimensions using an input system having a single-lens.

The method according to the present invention considers a range of density for human hair on the human head as a constant. Accordingly, the method abstracts the part of an image corresponding to the hair on the head of a targeted human being, and calculates the distance from a camera to the targeted human being, where the calculation assumes that the horizontal width of the hair on the head of all human beings is a constant.

It is possible to detect easily the location of a human being in three-dimension using a simple input system using the method for detecting the location of a human being in three dimensions according to the present invention.

BRIEF DESCRIPTION OF TEE DRAWINGS

PREFERRED EMBODIMENT OF TEE PRESENT INVENTION

Hereinafter, an embodiment of the method for detecting the location of a human being in three dimensions according to the present invention is described with reference to the attached drawings.

Figure 1:
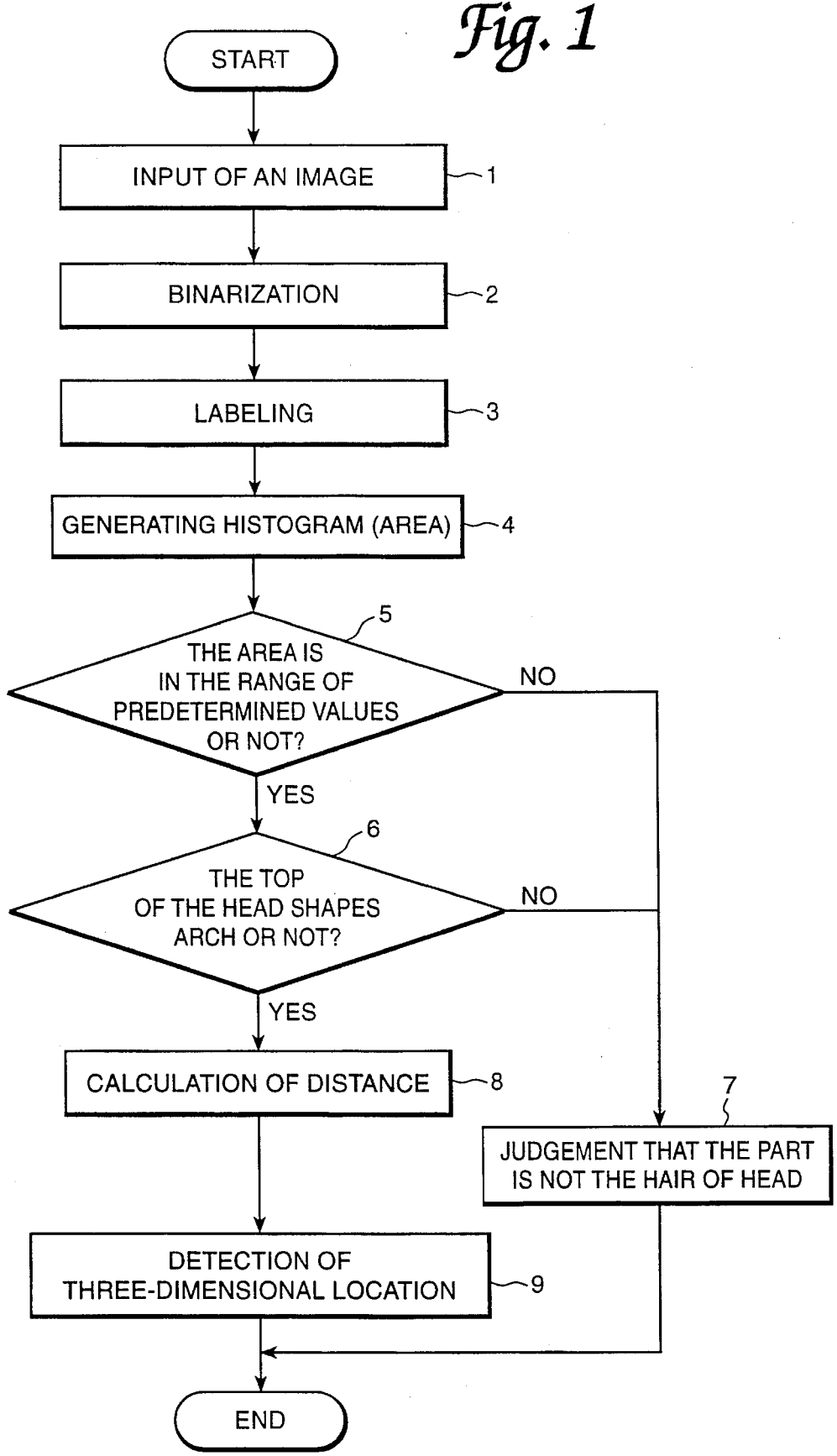
FIG. 1 shows a flowchart for an embodiment of this invention.
Figure 2:
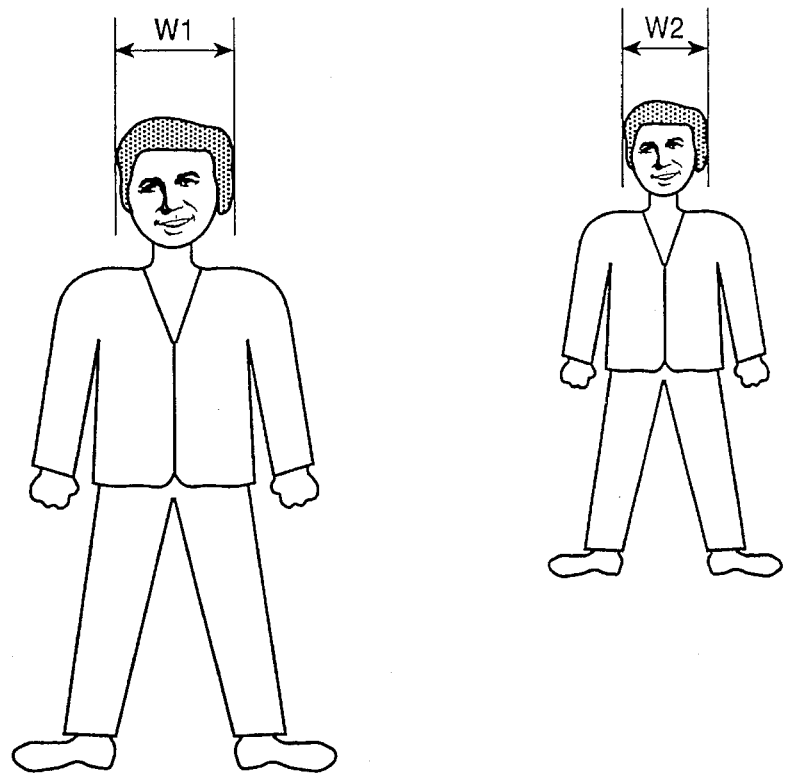
FIG. 2 illustrates the width of the part of hair on the head.

FIG. 2 shows an image of 2 people standing upright. The horizontal width of the hair on the head of each person is shown by W1 and W2, respectively.

Figure 3:
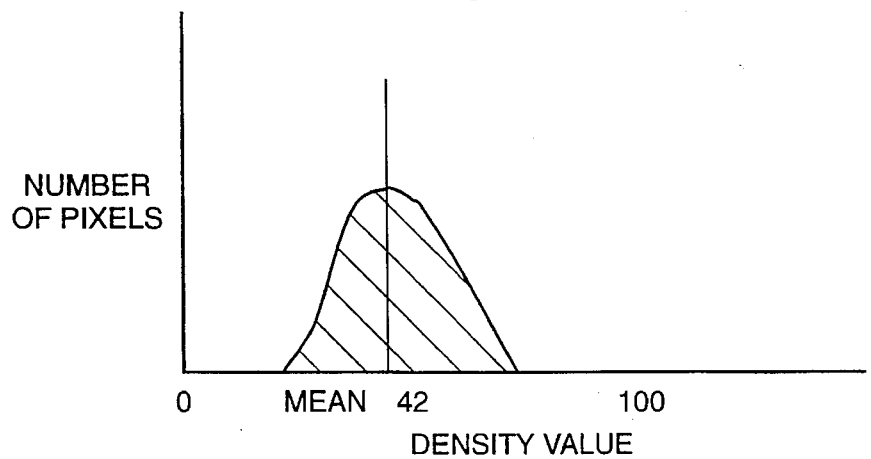
FIG. 3 shows a histogram of the part of hair on the head.

In Japan, human hair generally has a rather low density value (FIG. 3). It is therefore possible to estimate the range of density values for hair and to assume those density values to be constant.

The method for abstracting the part on hair on the head is explained as follows. In step 1, an image is input. In step 2, the input image is binarized based on a brightness threshold of, for instance, 100. The brightness threshold is set at a density of 100 because it is clear from experience that the brightness value of images of hair is always under 100 while the person is located indoors. Thus, it is possible to distinguish hair on the head from hair on other parts of the body by binarizing based on a density of 100.

When the binarized image shows parts of hair on the body with the same brightness as the hair on the head, the hair on the head is distinguished as follows. The area of each part of the binarized image corresponding to hair is calculated by labeling the binarized image (step 3) and counting the number of pixels using a histogram (step 4). Because the maximum area and the minimum area for hair on the head area may be calculated preliminarily, only the part of the binarized image in the range of both of the predetermined values is a candidate for the part of hair on the head (step 5).

A candidate for the part of the binarized image corresponding to a top of the hair on the head is determined based on whether it shapes an arch or not (step 6). Because a part of the head having no hair may be included as a candidate even when the density value and the area are within the predetermined values, the following procedure must be followed. The top part of human hair on the head is generally shaped like an arch. Based on this characteristic, it can be determined whether a part of the binarized image corresponds to hair on the head or not. Specifically, whether a part of the binarized image is shaped in an arch is determined based whether the curvature of the top the candidate part of the binarized image is within the predetermined value or not.

Figure 5:
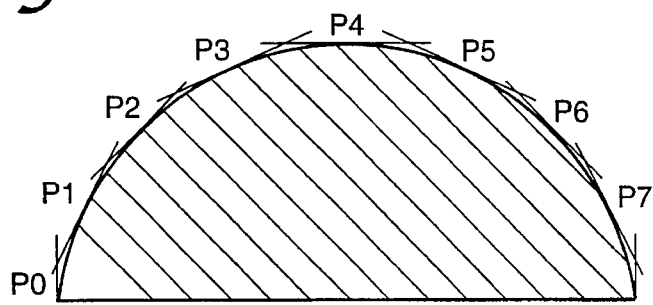
FIG. 5 shows an image of the intersections of tangents to an arched line.
Figure 6:
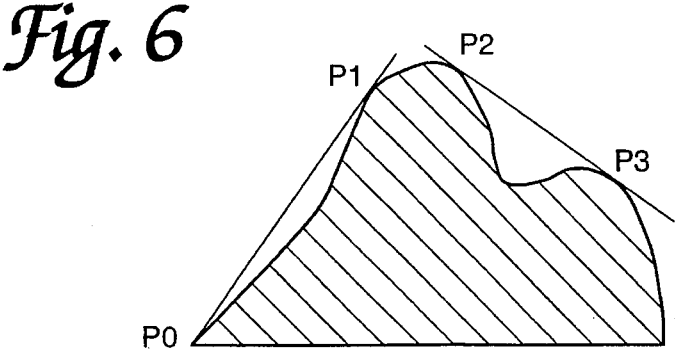
FIG. 6 shows an image of the intersection of tangents to a non-arched line, where "W" shows horizontal width of an image, "W1" shows horizontal width of head, and "W2" shows horizontal width of head.

FIG. 5 shows an example where the distance of intersection between tangents P0–P7 to a part of a binarized image is short, and the change of curvature is within the predetermined value. In contrast, FIG. 6 shows an example when the distance of intersection between tangents P0–P3 of a part of a binarized image is long and the change of curvature is unstable. If the change of curvature is within the predetermined range, it is recognized as an arch, and the corresponding part of the binarized image is considered to represent the part of human hair on the head.

When it is determined that the area is not within the fixed range (step 5) and the shape is not arched (step 6), it is determined that the figure is not a part of the hair (step 7).

Figure 4:
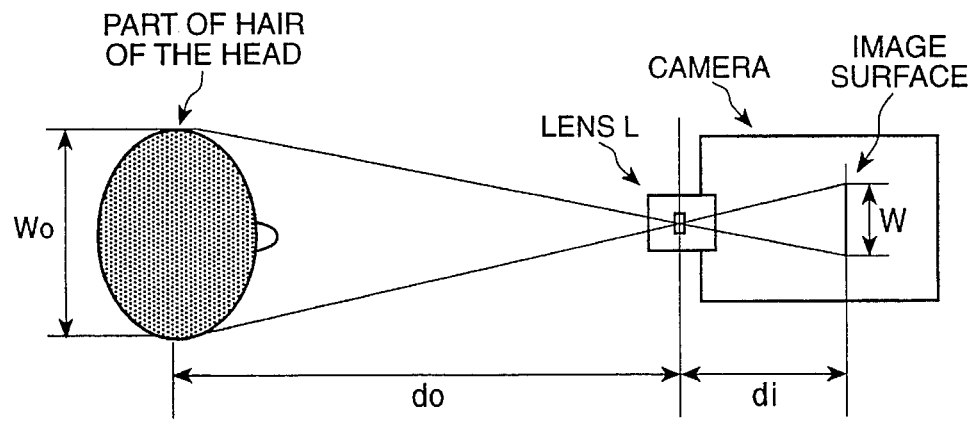
FIG. 4 shows an image of the position of hair on the head and a camera.

Once the part of the binarized image corresponding to hair on the head is identified, the distance between the camera and the human being is calculated (step 8). The horizontal width of the hair on the head is assumed to be constant since it does not generally vary greatly from person to person. Treating the horizontal width as a constant simplifies the calculation. In FIG. 4, the distance from the lens to the image surface is identified as "di", the distance from the lens to a human being is identified as "do", the horizontal width of the head part of the image surface is identified as "W" and the horizontal width of the head part of human being is identified as "Wo" (constant). Applying simple geometric principles, it is clear that:

$$do = \frac{Wo}{W} \times di.$$

As shown from the formula above, the distance "do" can be easily calculated. Given the distance "do", the value of coordinate of the horizontal and the vertical direction are easily calculated by applying well-known methods. Accordingly, the location of a human being in three dimension is detected (step 9).

As mentioned above, it is possible to detect three-dimensional location including depth (distance) using a simple system of a single-lens by the present invention.

What is claimed is:

1. A method for detecting the location of a human being in three dimensions, the method comprising the steps of:

inputting a spatial image of an area using a lens, at least a head of hair on a person being located in the area identifying at least one portion of the spatial image having density values within a predetermined range, the density values being based on brightness levels of the spatial image;

selecting at least one of the identified portions that has a top region forming the shape of an arch;

determining the width of the at least one selected portion;

calculating the distance from the lens to the person based on the horizontal width of the selected portion; and calculating a horizontal coordinate value and a vertical coordinate value based on the distance from the lens to the person.

2. The method claimed in claim 1, wherein the identifying step includes a step of determining that the identified portion of the image forms an arch when a change of curvature on the top region of the identified portion is within a predetermined value.

3. The method claimed in claim 1, wherein the step of identifying includes recognizing that density values in the part of the spatial image are within the predetermined range.

4. A method for determining distance from an observing instrument to a person, the method including the steps of:

inputting a spatial image of an area within which at least a part of the person is located using the observing instrument;

identifying a portion of the spatial image corresponding to a head of hair on the person;

measuring a width of the portion of the spatial image identified as corresponding to the head of hair; and determining the distance from the observing instrument to the person based on the measured width.

5. A method as recited in claim 4, wherein the spatial image is input by focusing a projection of the area on an image surface using a lens, the observing instrument including the lens and the image surface, and wherein the distance from the observing instrument to the person is determined based on a relationship between the measured width and a distance from the image surface to the lens.

6. A method as recited in claim 5, wherein the step of identifying the head of hair includes the steps of:

binarizing pixels of the image surface that correspond to the focused spatial image;

selecting at least one first group of binarized pixels based on density;

selecting at least one second group of binarized pixels from among said at least one first group based on size; and selecting the head of hair from among said at least one second group based on a curvature defined by the second group of pixels, a group of pixels corresponding to the head of hair defining an arch shaped curvature.

7. A method as recited in claim 5, wherein the width of the portion of the spatial image corresponding to the head of hair is measured based on a number of pixels in the image surface that correspond to the head of hair.

8. A method as recited in claim 4, wherein the distance from the observing instrument to the person is determined based on a relationship between the measured width and an assumed width of a typical head of hair.

9. A method as recited in claim 8, wherein the determination of distance from the observing instrument to the person is also based on a distance from an image surface to a lens of the observing instrument, the spatial image being formed on the image surface using the lens.

* * * * *